United States Patent
Falkvall et al.

(10) Patent No.: US 6,299,769 B1
(45) Date of Patent: Oct. 9, 2001

(54) DISPOSABLE HEMODIAFILTRATION SET

(75) Inventors: Thore Falkvall, Helsingborg; Per-Olov Carlsson, Sosdala; Lars-Olof Sandberg, Ronneby, all of (SE)

(73) Assignee: Althin Medical AB, Ronneby (CH)

( * ) Notice: Subject to any disclaimer, the term of this patent is extended or adjusted under 35 U.S.C. 154(b) by 0 days.

(21) Appl. No.: 09/202,308

(22) PCT Filed: Jun. 13, 1997

(86) PCT No.: PCT/SE97/01049
§ 371 Date: Aug. 30, 1999
§ 102(e) Date: Aug. 30, 1999

(87) PCT Pub. No.: WO98/16269
PCT Pub. Date: Apr. 23, 1998

(30) Foreign Application Priority Data

Jun. 13, 1996 (SE) ................................... 9602329

(51) Int. Cl.[7] ................................... B01D 61/30
(52) U.S. Cl. ............... 210/232; 210/195.2; 210/252; 210/321.71; 210/416.1; 210/418; 210/420
(58) Field of Search ................ 210/195.1, 195.2, 210/232, 321.71, 416.1, 417, 418, 420, 252

(56) References Cited

U.S. PATENT DOCUMENTS

| 4,702,829 | | 10/1987 | Polaschegg et al. | 210/195.2 |
|---|---|---|---|---|
| 5,334,315 | * | 8/1994 | Matkovich et al. | 210/641 |
| 5,490,925 | | 2/1996 | Eigendorf | 210/321.69 |
| 5,499,974 | * | 3/1996 | Rosen | 604/253 |
| 5,540,668 | * | 7/1996 | Wilson, Jr. et al. | 604/248 |
| 5,702,597 | * | 12/1997 | Chevallet et al. | 210/195.2 |
| 6,022,481 | * | 2/2000 | Blake | 210/776 |

* cited by examiner

Primary Examiner—John Kim
(74) Attorney, Agent, or Firm—Paula J. F. Kelly; Charles R. Mattenson; Robert M. Barrett

(57) ABSTRACT

A sterile disposable hemodiafiltration set to be connected to a dialysis machine includes a dialyzer with an extracorporeal blood path and a dialysis liquid supply line which can be connected to the dialyzer. The hemodiafiltration set includes a sterilized unit consisting of a hose connection with a sterile filter therein wherein the hose connection is arranged for connection at one end thereof to the extracorporeal path via a separate pump and provided with a three-way joint at the other end thereof for connection of the latter end between the dialysis liquid supply line and the dialyzer.

14 Claims, 3 Drawing Sheets

DISPOSABLE HEMODIAFILTRATION SET

BACKGROUND OF THE INVENTION

Figure 1:
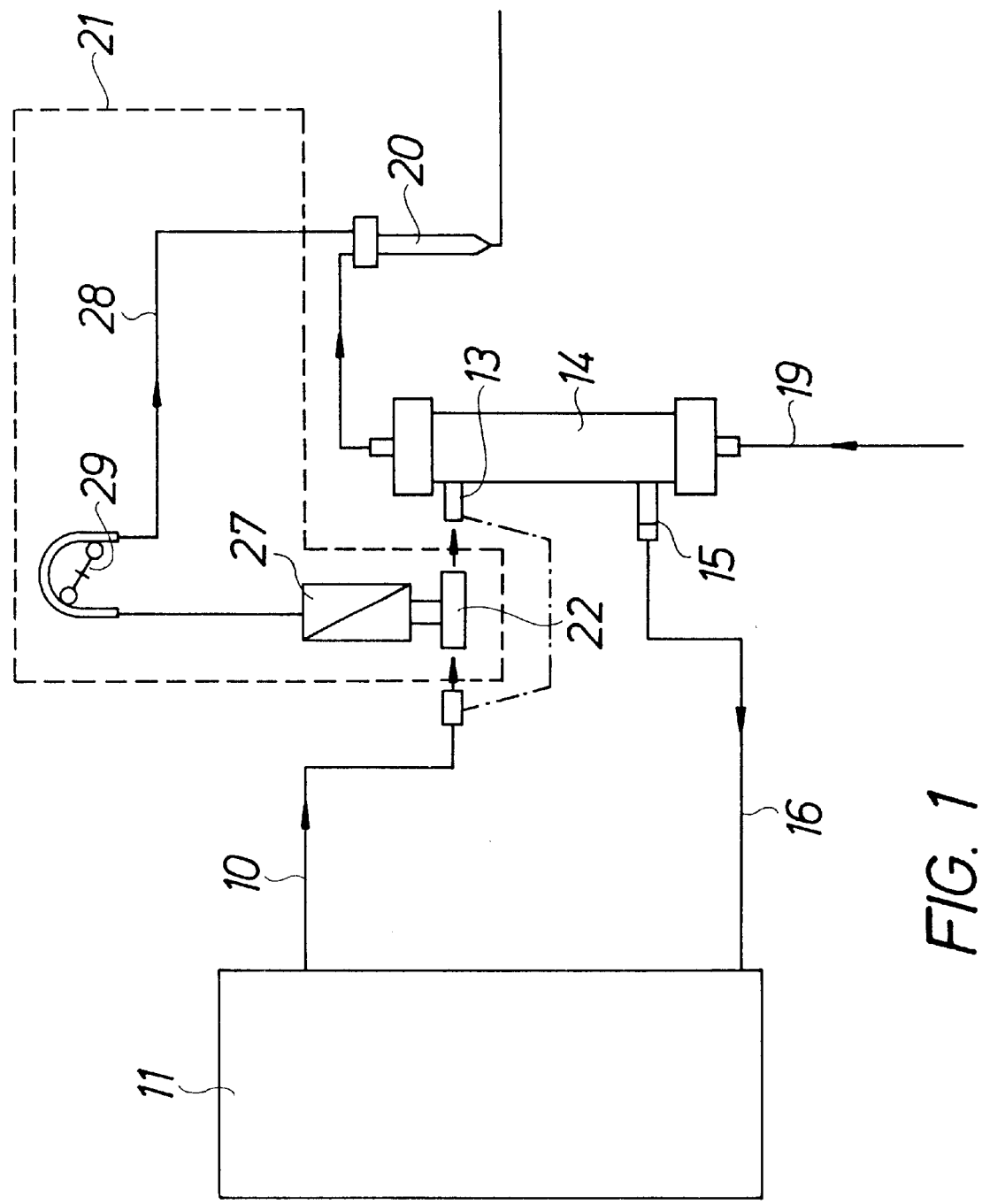

The invention relates to a sterile disposable hemodiafiltration set to be connected to a dialysis machine comprising a dialyzer with an extracorporeal blood path and a dialysis liquid supply line, which can be connected to the dialyzer.

In the conventional hemodialysis treatment impurities are separated from the blood in the dialyzer by diffusion while the separation of impurities in hemodiafiltration treatment is effected both by diffusion and by convection dialysis liquid being supplied as a substitute liquid to the blood in the extracorporeal path. Hemodiafiltration treatment is preferred because also greater molecules are separated from the blood; greater molecules cannot be separated to the same extent when the dialysis treatment includes diffusion only. The dialysis liquid to be supplied to the blood as the substitute liquid is of course subject to higher demands as to sterility than dialysis liquid passing through the dialyzer and, therefore, it undergoes supplementary filtering before being supplied to the blood path.

U.S. Pat. No. 4,702,829 describes a machine for hemodiafiltration wherein the dialysis liquid to be used as substitute liquid is passed through two sterile filters provided in the machine which are not used for filtering the dialysis liquid to be supplied to the dialyzer. Having passed the sterile filters the substitute liquid is passed through a disposable line section including a microfilter and being connected to the blood path either on the outlet side of the dialyzer (post-dilution) or on the inlet side of the dialyzer (pre-dilution).

In the dialysis machine intended for hemodiafiltration according to U.S. Pat. No. 4,702,829 as in other dialysis machines on the market, intended for hemodiafiltration there is provided on the machine a separate outlet for substitute liquid to which a disposable set forming part of the hemodiafiltration circuit is connected in order to set up the dialysis machine for hemodiafiltration treatment, said circuit being partly permanent and exposed to disinfection between the treatments in the dialysis machine especially constructed for hemodiafiltration.

SUMMARY OF THE INVENTION

Taking into account that the dialyzer always is connected to the dialysis machine via hoses by quick connectors (Hansen connectors) the object of the invention is to provide a disposable set which can be easily connected to any dialysis machine constructed for hemodialysis and having ultrafiltration control but in no way constructed or prepared for hemodiafiltration treatment, in order to allow that the dialysis liquid to be supplied to the dialyzer is partly drained off and after filtration in a sterile microfilter included in the disposable set, is supplied to the blood path.

In order to achieve said object the disposable set of the kind referred to above has obtained according to the invention the features of the claims. By this arrangement it is possible to make dialysis liquid available on any dialysis machine constructed for hemodialysis and having ultrafiltration control simply by disconnecting the dialyzer from the dialysis liquid and supply line and interconnecting the three-way joint between the supply line and the dialyzer the dialysis liquid after filtration in the sterile filter being supplied via the hose connection to the blood path at one side or the other of the dialyzer (pre-dilution or post-dilution, respectively).

According to a preferred embodiment of the invention the sterile filter is combined with the three-way joint and forms an integral unit therewith.

BRIEF DESCRIPTION OF THE INVENTION

Figure 2:
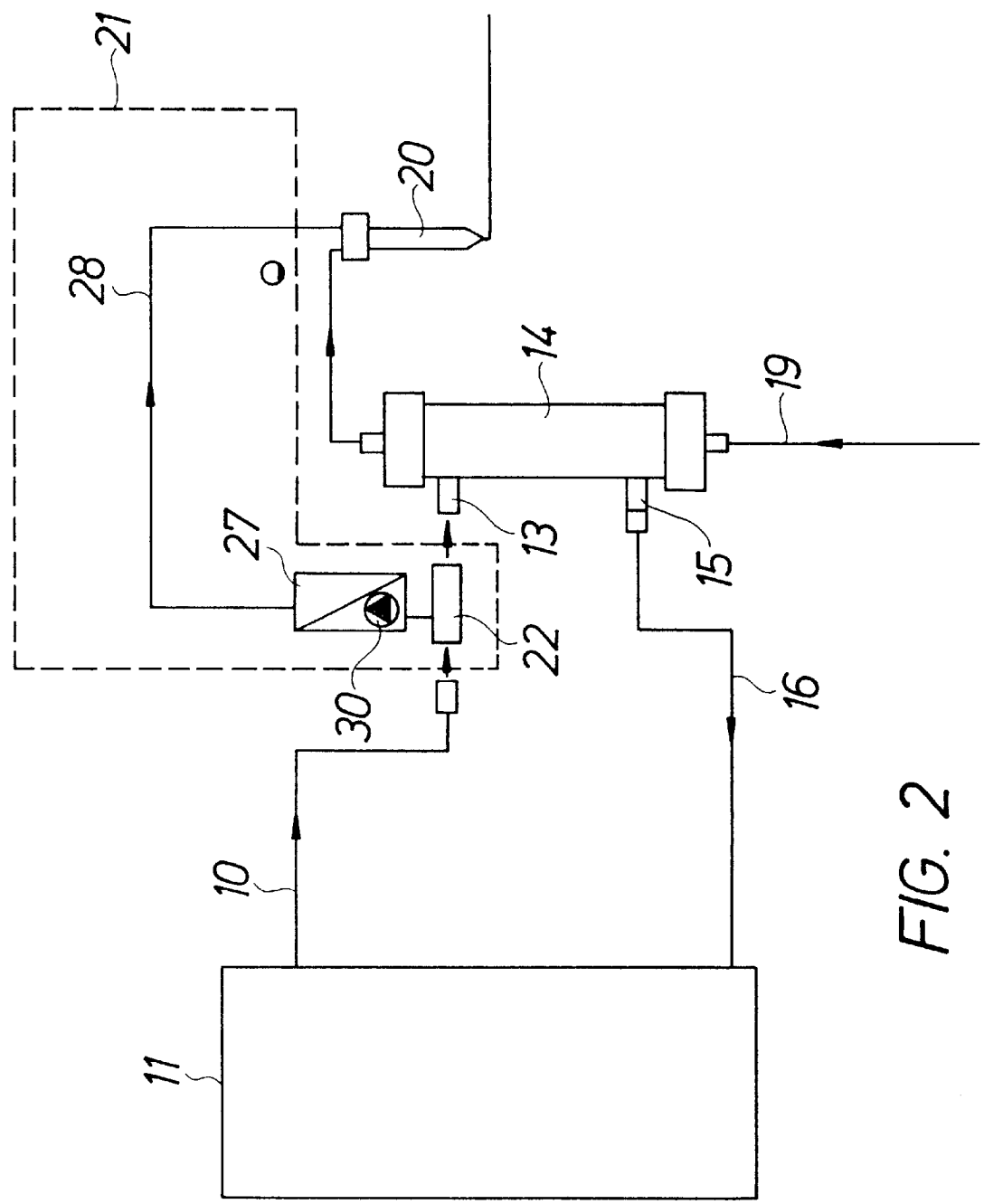
Figure 3:
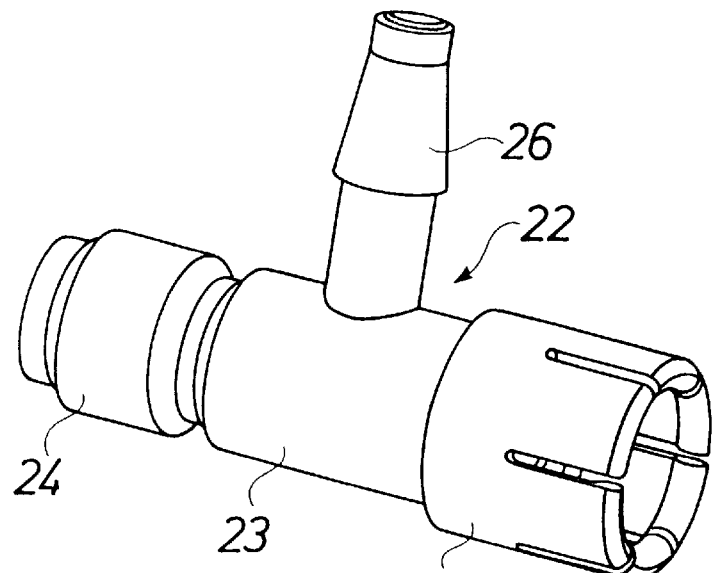
Figure 4:
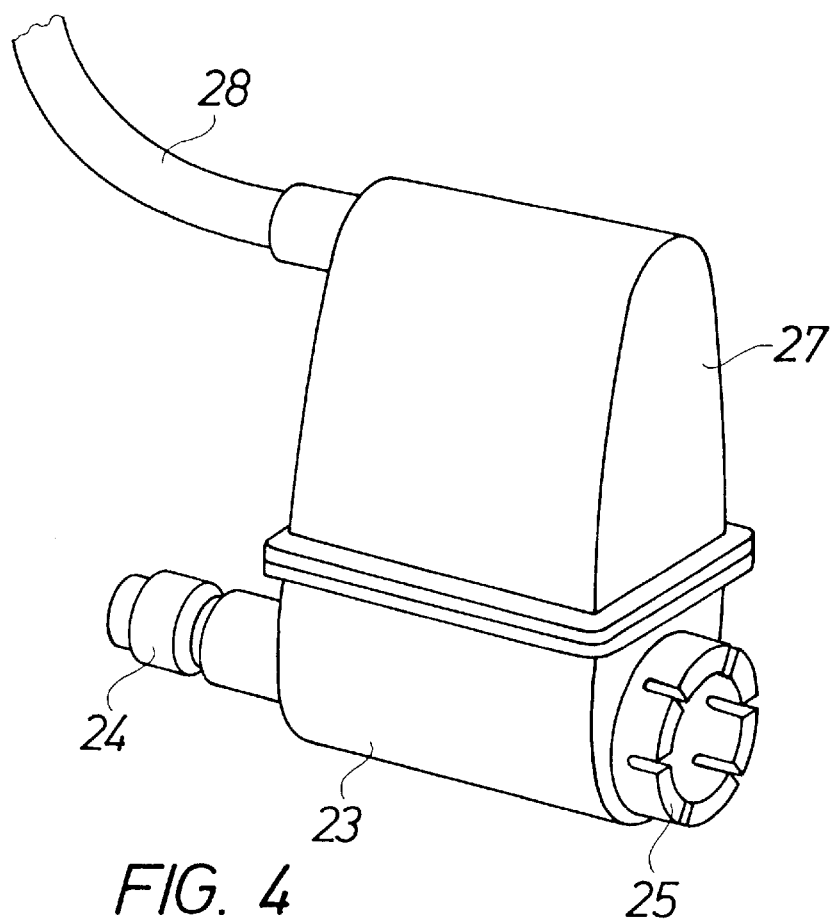

In order to explain the invention in more detail reference is made to the accompanying drawings disclosing an illustrative embodiment and wherein FIG. 1 is a diagram of a dialysis machine constructed for hemodialysis and having ultrafiltration control with the disposable set according to the invention in one embodiment thereof, FIG. 2 is a corresponding diagram of a dialysis machine with a disposable set of a second embodiment, FIG. 3 is a perspective view of a three-way joint forming part of the disposable set, and FIG. 4 is a perspective view of a three-way joint made integral with a sterile filter.

In FIG. 1 a dialysis machine constructed only for hemodialysis and having ultrafiltration control indicated by a block 11. The machine supplies dialysis liquid of high quality in a line 10 which is connected to the dialysis liquid inlet 13 of a dialyzer. The dialysis liquid outlet 15 thereof is connected to an outlet line 16. An extracorporeal blood path 19 extends through the dialyzer 14 and includes a drip chamber 20.

In order to allow hemodiafiltration treatment by using the dialysis machine with the system described the invention provides a sterile disposable hose set located within the dash line frame 21. This disposable hose set comprises a three-way joint 22 of the kind disclosed in FIG. 3. The three-way joint comprises a socket 23 with quick connectors at both ends thereof, so called Hansen connectors, one connector 24 thereof being a male connector to be connected with supply line 10, and the other connector 25 being a female connector to be connected with inlet 13 for dialysis liquid of the dialyzer 14, The inlet is provided with a male connector and the supply line with a female connector, and in conventional hemodialysis treatment these two connectors are interconnected as indicated by a dot-and-dash line, but when a hemodiafiltration treatment shall take place the connectors are disconnected and socket 23 of the three-way joint is interconnected therebetween. The three-way joint also has a branch socket 26 and is connected at this socket with a sterile filter 27 which is connected to one end of a hose 28. The hose set is delivered in a sterile package. After the three-way joint has been connected as explained above the other end of hose 28 is connected to drip chamber 20 and the hose is placed around the rotor of a peristaltic pump 29.

From the flow of dialysis liquid supplied to the dialyzer a flow determined by the peristaltic pump thus is drained off, and after filtration in the microfilter this flow is supplied to the drip chamber to be supplied to the blood in the extracorporeal blood path during a hemodiafiltration treatment. The supply can take place at another site either for post-dilution, as shown, or for pre-dilution.

In a preferred development of the invention the sterile filter 27 is integrated with the three-way joint 22 as shown in FIG. 4. The filter can instead be integrated with another element in the circuit for substitute flow for example with the drip chamber 20.

In the embodiment according to FIG. 2 the peristaltic pump is replaced by a pump—indicated by a symbol 30—which is combined with the unit formed by the three-way joint 22 and the sterile filter 27. The pump is connected with a turbine which is driven by the dialysis liquid flow to the dialyzer 14, to pump substitute liquid to the extracorporeal path via the sterile filter.

Summarizing, the invention provides the possibility of effecting by means of an ultrafiltration controlled dialysis machine, constructed for hemodialysis only and not constructed or prepared for hemodiafiltration treatment, a hemodiafiltration treatment without performing any modification in the machine or the program thereof. In other words, no machine of special construction is necessary for hemodiafiltration.

What is claimed is:

1. A sterile disposable hemodiafiltration set to be connected to a dialysis machine comprising a dialyzer with an extracorporeal blood path and a dialysis liquid supply line which can be connected to the dialyzer the hemodiafiltration set comprising a sterilized unit consisting of a hose connection with a sterile filter provided therein said hose connection being arranged for connection at one end thereof to the extracorporeal path via a separate pump; and being provided with a three-way joint at the other end thereof for connection of said latter end between the supply line for dialysis liquid and the dialyzer.

2. The sterile disposable hemodiafiltration set according to claim 1, wherein the three-way joint is provided with quick connectors for connection to matching quick connectors on the dialysis liquid supply line and the dialyzer, respectively.

3. The sterile disposable hemodiafiltration set according to claim 2, wherein the three way joint and the sterile filter are integrated to form a unit.

4. The sterile disposable hemodiafiltration set according to claim 2, wherein the hose connection forms a liquid conducting element in a peristaltic pump.

5. The sterile disposable hemodiafiltration set according to claim 2, wherein the pump is coupled to the three-way joint.

6. The sterile disposable hemodiafiltration set according to claim 1, wherein the hose connection forms a liquid conducting element in a peristaltic pump.

7. The sterile disposable hemodiafiltration set according to claim 1, wherein the pump is coupled to the three-way joint.

8. A sterile disposable hemodiafiltration set to be connected to a dialysis machine comprising a dialyzer with an extracorporeal blood path and a dialysis liquid supply line which can be connected to the dialyzer, the hemodiafiltration set comprises a sterilized unit consisting of a hose connection with a sterile filter provided therein, said hose connection being arranged for connection at one end thereof to the extracorporeal path via a separate pump and being provided with a three-way joint at the other end thereof for connection of said latter end between the supply line for dialysis liquid and the dialyzer, the three-way joint and the sterile filter are integrated to form a unit.

9. The sterile disposable hemodiafiltration set according to claim 8, wherein the hose connection forms a liquid conducting element in a peristaltic pump.

10. The sterile disposable hemodiafiltration set according to claim 8, wherein the pump is coupled to the three-way joint.

11. A hemodiafiltration set that can be removably coupled to a dialysis machine that includes a dialyzer, an extracorporeal blood path, and a dialysis liquid supply line, the hemodiafiltration set comprising:

a fluid flow path including a sterile filter, the fluid flow path being coupled at one end thereof to the extracorporeal blood path via a pump and at a second end thereof to a three-way joint, the three-way joint including a first end connected to the dialysis liquid supply line and a second end connected to the dialyzer so that fluid flows directly from the second end of the three-way joint into the dialyzer.

12. The sterile disposable hemodiafiltration set according to claim 11, wherein the three-way joint is provided with quick connectors for connection to matching quick connectors on the dialysis liquid supply line and the dialyzer, respectively.

13. A hemodiafiltration set that is designed to be coupled to a hemodialysis machine having a dialyzer, an extracorporeal blood path, and a dialysis liquid supply line comprising:

a fluid flow path including a sterile filter, the fluid flow path being coupled at one end thereof to the extracorporeal blood path and at a second end thereof to a three-way joint, the three-way joint including a first end removably connected to the dialysis liquid supply line and a second end removably connected to the dialyzer.

14. A dialysis machine comprising:

a dialyzer;

an extracorporeal blood path;

a dialysis liquid supply line; and a removable hemodiafiltration set including a fluid flow path including a sterile filter, the fluid flow path being coupled at one end thereof to the extracorporeal blood path via a pump and at a second end thereof to a three-way joint, the three-way joint including a first end connected to the dialysis liquid supply line and a second end connected to the dialyzer so that fluid flows from the second end of the three-way joint into the dialyzer.

* * * * *